United States Patent
Avakian et al.

(10) Patent No.: US 6,214,915 B1
(45) Date of Patent: Apr. 10, 2001

(54) STABILIZED THERMOPLASTIC COMPOSITIONS

(75) Inventors: Roger W. Avakian, Parkersburg, WV (US); William P. Enlow, Belpre, OH (US); Vaikunth S. Prabhu, Morgantown, WV (US); Carloss L. Gray, Belpre, OH (US); James A. Mahood, Morgantown, WV (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/208,904

(22) Filed: Dec. 10, 1998

(51) Int. Cl.⁷ .................................................... C08K 5/08
(52) U.S. Cl. ........................ 524/358; 524/359; 524/360
(58) Field of Search .................... 524/356, 357, 524/358, 359, 360

(56) References Cited

U.S. PATENT DOCUMENTS

| | | | |
|---|---|---|---|
| 3,852,227 | * 12/1974 | Matsuda | ................................. 260/23 |
| 4,104,246 | 8/1978 | Mark . | |
| 4,311,620 | * 1/1982 | Sherwood | ................................. 260/9 |
| 4,352,905 | * 10/1982 | Patton | ................................. 524/359 |
| 4,371,651 | * 2/1983 | Leistner | ................................. 524/178 |
| 4,427,816 | * 1/1984 | Aoki | ................................. 524/357 |
| 4,515,666 | * 5/1985 | Rekers | ................................. 524/347 |
| 4,883,886 | 11/1989 | Huang . | |
| 4,946,894 | 8/1990 | Henton et al. . | |
| 4,963,470 | 10/1990 | Klingert et al. . | |
| 5,001,243 | 3/1991 | Fischer et al. . | |
| 5,096,948 | 3/1992 | Kurumada et al. . | |
| 5,216,158 | 6/1993 | Pawlowski et al. . | |
| 5,286,720 | 2/1994 | Niedbala et al. . | |
| 5,314,936 | * 5/1994 | Schwartz | ................................. 524/82 |
| 5,352,716 | 10/1994 | Chapman et al. . | |
| 5,373,006 | 12/1994 | Grollier . | |
| 5,426,197 | 6/1995 | Müller et al. . | |
| 5,476,664 | 12/1995 | Robinson et al. . | |
| 5,494,944 | 2/1996 | Meier et al. . | |
| 5,576,359 | 11/1996 | Uranao et al. . | |
| 5,661,187 | 8/1997 | Müller et al. . | |
| 5,698,614 | * 12/1997 | Ueda | ................................. 523/161 |
| 5,705,533 | 1/1998 | Müller et al. . | |

FOREIGN PATENT DOCUMENTS

| | | |
|---|---|---|
| 0 317 820 | 5/1989 | (EP) . |
| 0 434 618 | 6/1991 | (EP) . |
| 918 464 | 2/1963 | (GB) . |
| 1 067 341 | 5/1967 | (GB) . |
| 1 416 604 | 12/1975 | (GB) . |

* cited by examiner

Primary Examiner—Paul R. Michl

(57) ABSTRACT

Thermoplastic resin composition are provided that comprise a thermoplastic resin or mixture thereof and a stabilizing amount of an aromatic ketone compound, derivative of an aromatic ketone compound, or an adduct of an aromatic ketone compound, optionally containing a stabilizing amount of a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydrotalcites, the epoxydized soybean oils, the hydroxylamines, the tertiary amine oxides, thermal reaction products of tertiary amine oxides, and the thiosynergists. The compositions have improved stability against thermal degradation.

39 Claims, No Drawings

_US 6,214,915 B1_

STABILIZED THERMOPLASTIC COMPOSITIONS

FEDERALLY SPONSORED RESEARCH

Not applicable.

CROSS-REFERENCE TO RELATED APPLICATIONS

Not applicable.

BACKGROUND OF THE INVENTION

1. Field of the Invention

The present invention pertains to resin compositions which are stabilized against degradation and/or discoloration by an effective amount of an aromatic ketone compound, including adducts and derivatives of an aromatic ketone compound. The resin compositions may optionally contain a stabilizer or mixture of stabilizers of at least one stabilizer selected from the group consisting of the phenolic antioxidants, the 3-arylbenzofuranones, the hindered amine stabilizers, the ultraviolet light absorbers, the tertiary amine oxides, the organic phosphorus compounds, the alkaline metal salts of fatty acids, the hydrotalcites, the epoxydized soybean oils, the hydroxylamines, the tertiary amine oxides, thermal reaction products of tertiary amine oxides, and the thiosynergists.

2. Brief Description of the Related Art

Although various antioxidants have long been known to be effective stabilizers for polymeric resins and have enjoyed wide commercial success for that use, these same stabilized polymeric resin compositions continue to degrade during high temperature processing such as during compounding and processing into articles of commerce.

While the addition of organic phosphites to such resin compositions stabilized with phenolic antioxidants tends to reduce the degradation, it remains a serious practical problem.

Likewise polymeric resin compositions containing certain phenolic antioxidants and hindered amine stabilizers tend to degrade, especially when subjected to repeated extrusions. Although such stabilized resin compositions are improved, there continues to exist a need and desire to provide polymeric resin compositions which exhibit enhanced levels of stability and to provide alternate stabilizer compositions for incorporation into polymer compositions.

Aromatic ketones, e.g., 2-bromo-9-anthrone and 2-ethyl-9-anthrone, have been reported as useful as sensitizers to increase the photopolymerization rate of photosensitive compounds, e.g. oxadiazole compounds, when used in combination with a photoinitiator. Skin conditions such as warts and psoriasis have also been treated with 1,8-dihydroxy-anthrone.

The use of aromatic ketones, as well as adducts and derivatives of aromatic ketone compounds, until this time as stabilizer additives for polymeric resins, however, is believed to be novel, especially when used in combination with other additives.

SUMMARY OF THE INVENTION

The broad object of the instant invention is to provide a polymeric resin composition that contains an amount of an aromatic ketone compound, including adducts and derivatives of an aromatic ketone compound, effective to stabilize the composition against degradation, especially degradation during high temperature processing (e.g., melt processing) such as during compounding and/or processing into articles of commerce. The compositions of the present invention may also contain more than one aromatic ketone compound, including adducts and derivatives of an aromatic ketone compound, effective to stabilize the composition against degradation, especially degradation during high temperature processing such as during compounding and/or processing into articles of commerce.

In a first preferred embodiment of the invention, the aromatic ketone compound is anthrone, anthralin, a derivative of anthrone, a derivative of anthralin, an adduct of anthrone, an adduct of anthralin, or a mixture containing any of the foregoing.

In a second preferred embodiment of the invention, a polymeric resin composition stabilized against degradation is provided containing an aromatic ketone compound, including adducts and derivatives of an aromatic ketone compound, which also contains a stabilizer or mixture of stabilizers selected from the group consisting of the phenolic antioxidants, the 3-arylbenzofuranones, the tertiary amine oxides, the hindered amine stabilizers, the ultraviolet light absorbers, the organic phosphorus compounds, the hydroxylamines, the tertiary amine oxides, thermal reaction products of tertiary amine oxides, and the thiosynergists.

In a third preferred embodiment of the invention, is provided a resin composition which is stabilized against degradation upon exposure to heating wherein the resin composition contains a combination of an amount of an aromatic ketone compound, including adducts and derivatives of an aromatic ketone compound, and a phenolic antioxidant effective to stabilize the resin composition.

In a fourth preferred embodiment of the invention, is provided a resin composition which is stabilized against degradation upon exposure to heating wherein the resin composition contains a combination of an amount of an aromatic ketone compound, including adducts and derivatives of an aromatic ketone compound, a tertiary amine oxide, and a phenolic antioxidant effective to stabilize the resin composition.

In a fifth preferred embodiment of the invention, is provided a resin composition which is stabilized against degradation upon exposure to heating wherein the resin composition contains a combination of an amount of an aromatic ketone compound, including adducts and derivatives of an aromatic ketone compound, an organic phosphorus compound, and a phenolic antioxidant effective to stabilize the resin composition.

In a sixth preferred embodiment of the invention, is provided a resin composition which is stabilized against degradation upon exposure to heating wherein the resin composition contains a combination of an amount of an aromatic ketone compound, including adducts and derivatives of an aromatic ketone compound, and a 3-arylbenzofuranone effective to stabilize the resin composition.

In a seventh preferred embodiment of the invention, is provided a resin composition which is stabilized against degradation upon exposure to heating wherein the resin composition contains a combination of an amount of an aromatic ketone compound, including adducts and derivatives of an aromatic ketone compound, and at least one of an alkaline metal salt of a fatty acid, a hydrotalcite, or epoxydized soybean oil, or one of the foregoing and a phenolic antioxidant effective to stabilize the resin composition.

In a eighth preferred embodiment of the invention, is provided a resin composition which is stabilized against degradation upon exposure to heating wherein the resin composition contains a combination of an amount of an aromatic ketone compound, including adducts and derivatives of an aromatic ketone compound, an alkaline metal salt of a fatty acid or said metal salt, a hydroxylamine, and a phenolic antioxidant effective to stabilize the resin composition.

In a ninth preferred embodiment of the invention, is provided a resin composition which is stabilized against degradation upon exposure to heating wherein the resin composition contains a combination of an amount of an aromatic ketone compound, including adducts and derivatives of an aromatic ketone compound, a phenolic antioxidant and a hindered amine stabilizer effective to stabilize the resin composition.

In a tenth preferred embodiment of the invention, is provided a resin composition which is stabilized against degradation upon exposure to heating wherein the resin composition contains a combination of an amount of an aromatic ketone compound, including adducts and derivatives of an aromatic ketone compound, a phenolic antioxidant and an ultraviolet light absorber effective to stabilize the resin composition.

In a eleventh preferred embodiment of the invention, is provided a resin composition which is stabilized against degradation upon exposure to heating wherein the resin composition contains a combination of an amount of an aromatic ketone compound, including adducts and derivatives of an aromatic ketone compound, a phenolic antioxidant, an ultraviolet light absorber, and an organic phosphorus compound effective to stabilize the resin composition.

In a twelfth preferred embodiment of the invention, is provided a resin composition which is stabilized against degradation upon exposure to heating wherein the resin composition contains a combination of an amount of an aromatic ketone compound, including adducts and derivatives of an aromatic ketone compound, phenolic antioxidant, a hindered amine stabilizer and an organic phosphorus compound effective to stabilize the resin composition.

In a thirteenth preferred embodiment of the invention, is provided a resin composition which is stabilized against degradation upon exposure to heating wherein the resin composition contains a combination of an amount of an aromatic ketone compound, including adducts and derivatives of an aromatic ketone compound, phenolic antioxidant, an ultraviolet light absorber and a tertiary amine oxide effective to stabilize the resin composition.

In a fourteenth preferred embodiment of the invention, is provided a resin composition which is stabilized against degradation upon exposure to heating wherein the resin composition contains a combination of an amount of an aromatic ketone compound, including adducts and derivatives of an aromatic ketone compound, and at least one of a phenolic antioxidant, a hindered amine stabilizer, an organic phosphorus compound, a tertiary amine oxide, a hydrotalcite, epoxydized soybean oil and a thiosynergist compound effective to stabilize the resin composition.

In a fifteenth preferred embodiment of the invention, is provided a resin composition which is stabilized against degradation upon exposure to heating wherein the resin composition contains a combination of an amount of an aromatic ketone compound, including adducts and derivatives of an aromatic ketone compound, and a hindered amine stabilizer effective to stabilize the resin composition.

In a sixteenth preferred embodiment of the invention, is provided a resin composition which is stabilized against degradation upon exposure to heating wherein the resin composition contains a combination of an amount of an aromatic ketone compound, including adducts and derivatives of an aromatic ketone compound, phenolic antioxidant, and a thiosynergist effective to stabilize the resin composition.

In a seventeenth preferred embodiment of the invention, is provided a resin composition which is stabilized against degradation upon exposure to heating wherein the resin composition contains a combination of an amount of an aromatic ketone compound, including adducts and derivatives of an aromatic ketone compound, a tertiary amine oxide, and an organic phosphorus compound effective to stabilize the resin composition.

It should be clear that each of the preferred embodiments may contain other additives and/or stabilizers such as, for example, an alkaline metal salts of fatty acid. These and other objects will become apparent in the disclosure of the present invention.

DETAILED DESCRIPTION OF THE INVENTION

This invention pertains to resin compositions, stabilized against degradation, which comprises:

(a) a thermoplastic resin or mixture thereof, and (b) a stabilizing amount of at least one aromatic ketone compound, derivative of an aromatic ketone compound, or an adduct of an aromatic ketone compound.

This invention also pertains to resin compositions, stabilized against degradation, which comprises:

(a) a thermoplastic resin or mixture thereof, (b) a stabilizing amount of at least one aromatic ketone compound, derivative of an aromatic ketone compound, or an adduct of an aromatic ketone compound, and (c) a stabilizer or mixture of stabilizers selected from the group consisting of the phenolic antioxidants, the 3-arylbenzofuranones, the hindered amine stabilizers, the tertiary amine oxides, the ultraviolet light absorbers, the organic phosphorus compounds, the alkaline metal salts of fatty acids, the hydroxylamines, thermal reaction products of tertiary amine oxides, and the thiosynergists.

More particularly, the instant invention preferably pertains to stabilized compositions wherein component (a) is a polyolefin resin or mixture thereof.

The instant invention also preferably pertains to stabilized compositions wherein component (c) comprises:

1. a stabilizing amount of a phenolic antioxidant or mixture thereof; or 2. a stabilizing amount of a phenolic antioxidant or mixture thereof in combination with a stabilizing amount of:

a) an organic phosphorus compound or mixture thereof; or b) a hindered amine stabilizer or mixture thereof; or c) a thiosynergist or mixture thereof; or d) an ultraviolet light absorber or mixture thereof; or e) a hindered amine stabilizer and an organic phosphorus compound or mixtures thereof; or f) a hindered amine stabilizer, a thiosynergist and an organic phosphorus compound or mixtures thereof; or g) an ultraviolet light absorber and a hindered amine stabilizer or mixtures thereof; or h) an ultraviolet light absorber and an organic phosphorus compound or mixtures thereof; or
i) an alkaline metal salt of a fatty acid or mixture thereof; or
j) hydrotalcites, or
k) epoxydized soybean oils, or
l) a hydroxyl amine or mixture thereof; or
m) a tertiary amine oxide or mixture thereof;
n) a thermal reaction product of tertiary amine oxide, or 3. a stabilizing amount of an organic phosphorus compound or mixture thereof in combination with a stabilizing amount of:
   a) a phenolic antioxidant or mixture thereof; or
   b) a hindered amine stabilizer or mixture thereof; or
   c) a thiosynergist or mixture thereof; or
   d) an ultraviolet light absorber or mixture thereof; or
   e) a hindered amine stabilizer and a phenolic antioxidant or mixtures thereof; or
   f) a hindered amine stabilizer, a thiosynergist and a phenolic antioxidant or mixtures thereof; or
   g) an ultraviolet light absorber and a hindered amine stabilizer or mixtures thereof; or
   h) an ultraviolet light absorber and a phenolic antioxidant or mixtures thereof; or
   i) an alkaline metal salt of a fatty acid or mixture thereof;
   j) a hydrotalcite or mixture thereof, or
   k) an epoxydized soybean oil or mixture thereof, or
   l) a tertiary amine oxide or mixture thereof,
   m) a thermal reaction product of a tertiary amine oxide, or
   n) a hydroxyl amine or mixture thereof, or 4. a stabilizing amount of a hindered amine stabilizer or mixture thereof; or 5. a stabilizing amount of an alkaline metal salt of a fatty acid or mixture thereof; or 6. a stabilizing amount of a 3-arylbenzofuranone or mixture thereof; or 7. a stabilizing amount of a tertiary amine oxide or mixture thereof; or 8. a stabilizing amount of thermal reaction product of tertiary amine oxide or mixture thereof, or 9. a stabilizing amount of an organic phosphite compound or mixture thereof, or 10. a stabilizing amount of an organic phosphite compound and a tertiary amine oxide and/or a 3-arylbenzofuranone or mixture thereof.

Other combinations comprising two or more stabilizers or additives are also envisioned in the present invention.

The aromatic ketone compounds are preferably as represented by general formula:

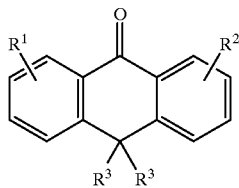

wherein $R^1$ and $R^2$ are independently a hydrogen, hydroxyl, thio, thio-ether, alkoxy, aryloxy, or alkyl moiety, and each $R^3$ is independently a hydrogen, alkyl, aryl, or substituted alkyl moiety containing at least one —O—, —S—, —SO—, —$CO_2$—, —CO—, or —CON— moiety, and wherein there may be multiple independent $R^1$ and $R^2$ groups. The aromatic ketone compounds are preferably non-polymeric aromatic ketone compounds.

The aromatic ketone compounds are generally a known class of compounds and many are known by common names. For example, when $R^1$ and $R^2$ are each hydroxyl and located in the 1,8-positions and each $R^3$ is hydrogen, the aromatic ketone compound is commonly referred to as dithranol or anthralin. Similarly, when $R^1$ and $R^2$, and $R^3$ are each hydrogen, the aromatic ketone compound is known as anthrone.

The 10-arylacyl and 10-phenylalkylidene substituted dithranol compounds, illustrative derivatives of anthralin, are useful classes of aromatic ketones. The phenylacyl functionality can be acylated onto an anthacenone nucleus by reaction of an appropriate acyl chloride under weakly basic conditions. The alkylidene substitution into the 10 position can be accomplished through known procedures with α-chloro methyl ethers in the presence of a non-nucleophilic base, for example, DBU, followed by removal of the corresponding alcohol. Useful procedures for these reaction can be found in U.S. Pat. No. 5,426,197.

The alkyl ethers of dithranol as well as the 1,8,9-triacetate compounds are known and effective derivatives useful in the present invention. The dialkyl ethers, for example, 1,8-dimethyl ether of dithranol may be conveniently prepared by treatment of dithranol with dimethyl sulfate in the presence of potassium carbonate.

Preferred aromatic ketone compounds include anthrone and derivatives of anthrone and anthralin and derivatives of anthralin. By derivatives is meant compounds having the generic backbone structure of anthrone or anthralin. Preferred derivatives of aromatic ketones include those of the general formulas:

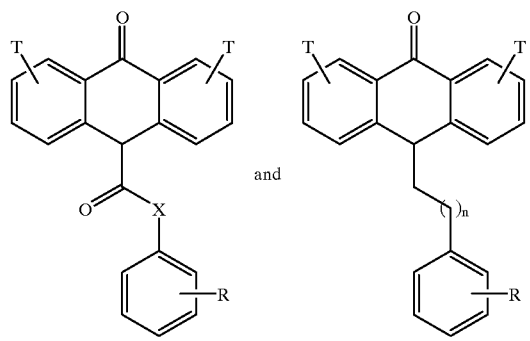

wherein each T can independently be hydrogen, hydroxyl, thio, thio-ether, alkoxy, aryloxy, or alkyl moiety, and R can be a wide variety of groups such as, for example, hydrogen, alkyl, hydroxy, aryloxy, arylmethoxy, halo, mercapto, amino, as well as substituted mercapto and substituted amino. T can represent multiple moieties. R can also represent multiple moieties such as 3,4,5-trihydroxy and 3,4,5-triamino. X is selected from alkylidene and substituted alylkidene, such as, e.g., $CH_2$, $(CH_2)_2$, and $CH=CH_2$, and n ranges from 0 to about 6.

Preferred derivatives of aromatic ketone compounds include those of the general formula:

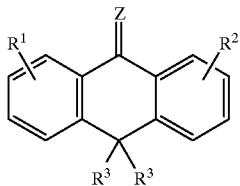

wherein $R^1$ and $R^2$ are independently a hydrogen, hydroxyl, thio, thio-ether, alkoxy, aryloxy, or alkyl moiety, and each $R^3$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent $R^1$ and $R^2$ groups, and wherein Z is selected from the group consisting of O, $NR^4$, N(OH), $NNHR^4$ and $NOR^4$ wherein $R^4$ is alkyl, aryl, or a substituted alkyl or a substituted aryl moiety, optionally containing at least one —O—, —S—, —SO—, —CO$_2$—, —CO—, or —CON— moiety.

Preferred derivatives of aromatic ketone compounds also include those of the general formula:

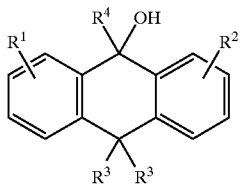

wherein $R^1$ and $R^2$ are independently a hydrogen, hydroxyl, thio, thio-ether, alkoxy, aryloxy, or alkyl moiety, and each $R^3$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent $R^1$ and $R^2$ groups, and wherein $R^4$ is alkyl, aryl or an substituted alkyl or substituted aryl moiety containing at least one —O—, —S—, —SO—, —CO$_2$—, —CO—, or —CON— moiety.

Another group of derivatives of aromatic ketone compounds also include those of the general formula:

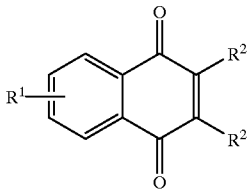

wherein $R^1$ and each $R^2$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent $R^1$ groups. A preferred member of this group is 1,4-naphthoquinone, wherein each $R^1$ and $R^2$ is hydrogen.

Adducts of aromatic ketone compounds, including adducts of anthrones and anthralins as well as derivatives of the foregoing, are also included in the present invention. Adducts include Diels-Alder reaction products between aromatic ketone compounds of the general formula:

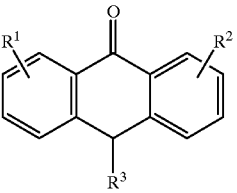

wherein $R^1$ and $R^2$ are independently a hydrogen, hydroxyl, thio, thio-ether, alkoxy, aryloxy, or alkyl moiety, and $R^3$ is a hydrogen, alkyl, aryl, or substituted alkyl moiety containing at least one —O—, —S—, —SO—, —CO$_2$—, —CO—, or —CON— moiety, and wherein there may be multiple $R^1$ and $R^2$ groups, with an unsaturated compound (a dienophile). Useful unsaturated compounds include compounds that contain both a carbon-carbon double bond or a carbon-carbon triple bond and at least one species of the group consisting of hydrogen, alkyl, aryl, alkaryl, acid, ester, hydoxyl, imide, amide, anhydride, thioester, phosphate, ether, thioether, oxazoline, epoxy, amino, and orthoester. The adducts are believed to be of the general formula:

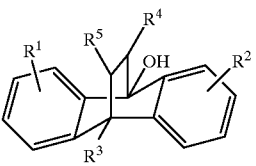

wherein $R^1$ and $R^2$ are independently a hydrogen, hydroxyl, thio, thio-ether, alkoxy, aryloxy, or alkyl moiety, and wherein there may be multiple $R^1$ and $R^2$ groups, and $R^3$ is a hydrogen, alkyl, aryl, or substituted alkyl or substituted aryl moiety containing at least one —O—, —S—, —SO—, —CO$_2$—, —CO—, or —CON— moiety and wherein $R^4$ and $R^5$ are independently hydrogen, alkyl, aryl, alkaryl, ester, acid, ether, amide, thioester, amine, or interconnected to form a ring, such as an imide or anhydride. Each $R^4$ and $R^5$ may each independently contain additional species of the group consisting of hydrogen, alkyl, aryl, alkaryl, acid, ester, hydoxyl, imide, amide, anhydride, thioester, ether, thioether, phosphate, oxazoline, epoxy, amino, and orthoester. Preferred dienophiles include, maleic anhydride, maleic acid, maleimides, acrylic acids and derivatives of acrylic acids, as well as various derivatives of maleic anhydride. Also included in the present invention are thermal reaction products of the Diels-Alder adducts previously mentioned. By thermal reaction products is meant various rearrangements of the adducts that occur due to the elevated temperatures that the adducts are subjected to during addition to the resin (e.g., melt compounding) and/or during conversion to articles of commerce. Exact chemical structures for the thermal reaction products are not presently known.

The aromatic ketone compound, including adducts and derivatives of an aromatic ketone compound, and also including any thermal reaction product of any of the foregoing, is preferably present in an amount effective to improve the melt stability, yellowness index, or melt stability and yellowness index of a thermoplastic composition. The amount is generally less than about 5 weight percent based on the weight of the thermoplastic resin, preferably less than about 300 ppm based on the weight of the thermoplastic resin, and is even more preferably between about 50 ppm and about 250 ppm based on the weight of the thermoplastic resin.

The thermoplastic resin, also referred to as a polymer, may be any thermoplastic known in the art, such as polyesters, polyurethanes, polyalkylene terephthalates, polyketones, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/ styrenic resin blends, polyvinyl chloride/ ABS or other impact modified polymers, such as methacrylonitrile and α-methylstyrene containing ABS, and polyester/ABS or polycarbonate/ABS and polyester plus some other impact modifier may also be used. Such polymers are available commercially or may be made by means well known in the art. However, the hydrocarbon amine oxides and stabilizer compositions of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally platicized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4dimethylol-cyclohexane terephthalate, poly-2(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide, 4,polyamide 6,polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABStype graft copolymers and mixtures thereof being particularly preferred.

The present compositions may optionally contain a stabilizer or mixture of stabilizers selected from the group consisting of the phenolic antioxidants, the hindered amine stabilizers, the ultraviolet light absorbers, the organic phosphorus compounds, the alkaline metal salts of fatty acids, the hydrotalcites, the epoxydized soybean oils, the hydroxyl amines, the tertiary amine oxides, thermal reaction products of tertiary amine oxides, and the thiosynergists. In an especially preferred embodiment, the present compositions also contain a stabilizing amount of a stabilizer or mixture of stabilizers selected from the group consisting of the phenolic antioxidants, the hindered amine stabilizers, the ultraviolet light absorbers, the organic phosphorus compounds, the alkaline metal salts of fatty acids, the hydroxyl amines, the tertiary amine oxides, thermal reaction products of tertiary amine oxides, and the thiosynergists. By stabilizing amount is meant an amount effective to afford stabilization against, for example, molecular weight degradation, color degradation or molecular weight degradation and color degradation from melt processing, from weathering, and/or from long term field exposure to heat, light, and/or the elements.

The phenolic antioxidants useful in the instant compositions embrace a large family of compounds examples of which are given below.

Simple 2,6-dialkylphenol, such as, for example, 2,6-di-tert.-butyl4-methylphenol, 2-tert.-butyl-4,6-di-methylphenol, 2,6-di-tert.-butyl-4-methoxymethylphenol 2,6-dioctadecyl-4-methylphenol and 2,6-di-tert.-butylphenol. Vitamin E and derivatives of vitamin E are also useful phenolic antioxidants.

Derivatives of alkylated hydroquinones, such as for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxy-anisole, tris-(3,5-di-tert.-butyl-4-hydroxyphenyl) phosphite, 3,5-di-20 tert.-butyl-4-hydroxyphenyl stearate and bis-(3,5-di-tert-butyl-4-hydroxyphenyl) adipate.

Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl4-hydroxyphenyl) disulfide.

Alkylidene-bisphenols, such as, for example, 2,2'-methylene-bis-(6-tert.-butyl-4-methylphenol), 2,2'-methylene-bis-(6-tert.-butyl4-ethylphenol), 4,4'-methylene-bis-(6-tert.-butyl-2-methylphenol), 4,4'-methylene-bis-(2,6-di-tert. -butylphenol), 2,6-di(3,-tert.-butyl-5-methyl-2-hydroxybenzyl)-4 -methylphenol, 2,2'-methylene-bis-[4-methyl-6-(alpha-methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane and ethylene glycol bis-[3,3-bis-(3-tert.-butyl-4-hydroxyphenyl)-butyrate].

O-, N- and S-benzyl compounds, such as, for example, 3,5,3',5'-tetra-tert.-butyl4 4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl) dithioterephthalate.

Hydroxybenzylated malonates, such as for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)-phenyl]2,2-bis-(3,5-di-tert.-butyl-4-hydroxybenzyl)-malonate.

Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert-butyl-4-hydroxybenzyl )-2,3,5,6-tetramethylbenzene and 2,4,6-tri(3,5-di-tert.-butyl4-hydroxybenzyl)-phenol.

s-Triazine compounds, such as, for example, 2,4-bisoctylmercapto-6-(3,5-di-tert.-butyl-4-hydroxl-anilino)-s-triazine, 2-octylmercapto,4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert-butyl-4-hydroxyphenylethyl)-s-triazine, 1,3,5-tris-(2,6-di-methyl-3-hydroxy4-tert-butylbenzyl)isocyanurate and 1,3-5-tris-(3,5-di-tert.-butyl-4-hydroxybenzyl)isocyanurate.

Amides of beta-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di(3,5-di-tert.-butyl-4-hydroxyphenyl-propionyl)-hexamethylenediamine. N,N'-bis-beta-(3,5-di-t-butyl-4-hydroxyphenyl)-propionylhydrazine.

Esters of beta-(3,5-di-tert.-butyl-4-hydroxyphenyl)-propionic acid with monohydric or polyhydric alcohols, such as, for example with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

Esters of beta-(5-tert.-butyl-4-hydroxy-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]-octane.

Esters of 3,5-di-tert.-butyl-4-hydroxyphenylacetic acid with monohydric or polyhydric alcohols, such as for example, with methanol, ethanol, octadecanol, 1,6-hexandiol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol trimethylolethane, trimethylolpropane, tris-hydroxyethyl isocyanurate and 4-hydroxymethyl-1-phospha-2,6,7-trioxabicyclo[2.2.2]-octane, especially the tetrakis ester of pentaerythritol.

Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl-5-tert.-butyl-4-hydroxy-3-methylbenzylphosphonate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl4-hydroxybenzylphosphonate, 1,3,5-tris(3,5-di-tert-butyl4-hydroxybenzyl)-isocyanurate, thiodiethylene bis(3,5-di-tert-butyl4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl4-hydroxyanilino)-3,5-di(octylthio)-s-triazine, N,N'-hexamethylene-bis(3,5-di-tert-butyl4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl4-hydroxybenzylmercaptoacetate, bis(3,5-di-tert-butyl4-hydroxyhydrocinnamoyl)hydrazide, and N,N'-bis-[2-(3,5-di-tert-butyl-4-hydroxyhydrocinnamoyloxy)ethyl]-oxamide.

A most preferred embodiment has as the phenolic antioxidant, neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4 -hydroxybenzyl)isocyanurate, 2,6-di-tert-butyl-p-cresol or 2,2'-ethylidene-bis(4,6-di-tert-butylphenol).

When an amine oxide is used in the present compositions, it is preferably a tertiary amine oxide as represented by general formula:

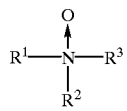

wherein $R^1$ and $R^2$ are independently each a $C_6$ to $C_{36}$ residue that may optionally contain at least one —O—, —S—, —SO—, —CO$_2$—, —CO—, or —CON— moiety; and $R^3$ is a $C_1$ to $C_{36}$ residue that may also optionally and independently contain at least one —O—, —S—, —SO—, —CO$_2$—, —CO—, or —CON— moiety. Included in the residues for $R^1$, $R^2$, and $R^3$ are benzyl and substituted benzyl residues. It is also possible for each of $R^1$, $R^2$, and $R^3$ to be the same residue. $R^1$ and $R^2$ are preferably $C_8$ to $C_{26}$ residues and most preferably $C_{10}$ to $C_{26}$ residues and $R^3$ is preferably $C_1$ to $C_{22}$ residues and most preferably a $C_1$ residue (e.g., methyl). Also, preferred amine oxides include those wherein $R^1$, $R^2$, and $R^3$ are the same $C_6$ to $C_{36}$ residues. Preferably, all of the aforementioned residues for $R^1$, $R^2$, and $R^3$ are saturated hydrocarbon residues or saturated hydrocarbon residues containing at least one of the aforementioned —O—, —S—, —SO—, —CO$_2$—, —CO—, or —CON— moieties. Those skilled in the art will be able to envision other useful residues for each of $R^1$, $R^2$, and $R^3$ without detracting from the present invention.

The amine oxide of the present invention also includes poly(amine oxides). By poly(amine oxide) is meant tertiary amine oxides containing at least two tertiary amine oxides per molecule. Illustrative poly(amine oxides) (also called "poly(tertiary amine oxides)") include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles. Also included are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —SO—, —CO$_2$—, —CO—, or —CON— moiety. In a preferred embodiment, each tertiary amine oxide of the polymeric tertiary amine oxide contains a $C_1$ residue.

In a preferred embodiment of the present invention, the amine oxide is attached to a molecule containing a hindered amine. Hindered amines are known in the art and the amine oxide of the present invention may be attached to the hindered amine in any manner and structural position of the hindered amine. Useful hindered amines in the present invention include those of the general formulas:

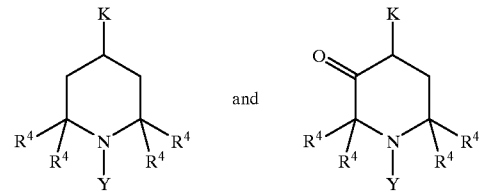

wherein K is a carbon chain containing the amine oxide (or amine oxides), Y is a $C_{1\text{-}30}$ alkyl moiety, a —C(O)R moiety wherein R is a $C_{1\text{-}30}$ alkyl group, or a —OR moiety wherein R is a $C_{1\text{-}30}$ alkyl group, and each $R^4$ is independently a $C_{1\text{-}30}$ alkyl group, preferably a methyl group. Also included are amine oxides containing more than one hindered amine and more than one amine oxide per molecule. The hindered amine may be attached to a poly(tertiary amine oxide) or attached to a polymeric substrate, as discussed above.

Amine oxides and processes for making thereof are set out in Richard J. Nadolsky *Amine Oxides* Encyclopedia of Chemical Technology, Vol. 2, pages 259–271, John Wiley & Sons, Inc. (1978), which is incorporated herein by reference.

Also included in the present invention are thermal reaction products of tertiary amine oxides. Under elevated temperatures, e.g., such as those useful to prepare the thermoplastic compositions of the present invention, amine oxides are believed to undergo various reactions. Some of these reactions are believed to result in the formation of various thermal reaction products, for example, hydroxyl amines and olefinic species. Although the mechanism for the stabilization of various resins with the tertiary amine oxides is presently unknown, it is believed that various reactive intermediates along the reaction pathways may play a role in the stabilization effect.

Amine oxide reaction products containing at least one long chain carbon residue are preferred in order to increase the solubility of the reaction products, including the hydroxyl amine-type reaction products, with the thermoplastic resin. When only a single alkyl substituent (i.e., only one of $R^1$, $R^2$, and $R^3$) in the tertiary amine oxide is a $C_6$ to $C_{36}$ residue and the other two alkyl substituents are $C_{1-5}$ residues, some of the hydroxyl amine-type reaction products are believed to contain only short chain substituents (i.e., $C_{1-5}$ residues). It is believed that this is a result of some of the long chain residues being eliminated from the amine oxide as an olefinic by-product. In order to insure that at least one long chain is retained in the hydroxyl amine-type thermal reaction products, either all three substituents should preferably be long chain or one chain can be $C_1$ (e.g., methyl) and the other two substituents be long chain (e.g., $C_6$ to $C_{36}$ residues). When one substituent is a $C_1$ residue and the other two substituents are long chain residues (including polymeric residues as previously described), the resultant thermal reaction product will be asymmetrical and contain a $C_1$ residue and a long chain residue. By long chain carbon residue is meant from $C_6$ to about $C_{36}$, preferably from $C_8$ to $C_{26}$ and most preferably $C_{10}$ to $C_{22}$. Also included by long chain residue are the before mentioned polymeric amine oxide residues. The long chain carbon residue may also optionally contain at least one of the before mentioned —O—, —S—, —SO—, —CO$_2$—, —CO—, or —CON— moieties described for $R^1$, $R^2$, and $R^3$. Hydroxyl amines-type reaction products that do not contain the aforementioned long chain residue tend to migrate out of the thermoplastic resin and can bloom to the surface of the thermoplastic resin or coat the surface of the processing equipment requiring costly downtime for cleaning and maintenance. It should be clear from the foregoing that the present invention includes hydroxyl amines containing at least one long chain carbon residue, preferably asymmetrical hydroxyl amines containing a long chain and a short chain; and also include polymeric hydroxyl amines containing at least two hydroxyl amines per molecule.

Especially preferred amine oxides for use in the present invention are saturated amine oxides and include dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri ($C_{20}$–$C_{22}$) amine oxide, di($C_{14}$–$C_{22}$ alkyl) methyl amine oxide, and di($C_{20}$–$C_{22}$ alkyl) methyl amine oxide. Especially preferred hydroxyl amine reaction products include saturated hydroxyl amines, for example, octyl methyl hydroxyl amine, decyl methyl hydroxyl amine, (coco alkyl) methyl hydroxyl amine, (tallow alkyl) methyl hydroxyl amine, and ($C_{20}$–$C_{22}$ alkyl) methyl hydroxyl amine. By the term "coco alkyl" is meant hydrogenated $C_{12}$–$C_{14}$ alkyl commonly referred to as hydrogenated coconut oil. By the term "tallow alkyl" is meant hydrogenated $C_{16}$–$C_{18}$ alkyl commonly referred to as hydrogenated tallow oil. Hydrogenated tallow oil is described in U.S. Pat. No. 4,876,300. The aforementioned hydrogenated coconut oil and hydrogenated tallow oil do contain some percentage of higher and/or lower carbon chain lengths than are described above and it should be understood that these other fractions are within the scope of the present invention. It is preferred that at least 75% of the carbon chains be within the described ranges for the coconut oil and tallow oil.

It should be clear that the present invention includes a thermoplastic resin composition comprising a thermoplastic resin, an aromatic ketone compound, and an amine oxide present at a level of from 0.001 to 5 percent by weight, based on the total weight of the composition, wherein the amine oxide has the structural formula:

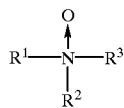

wherein $R^1$, $R^2$, and $R^3$ are independently selected from alkyl, aryl, aralkyl, alkaryl, cycloalkyl, alkcycloalkyl and cycloalkalkyl and each have from 1 to 36 carbon atoms per group, provided that if one of $R^1$, $R^2$, and $R^3$ is an alkyl group having from 6 to 36 carbon atoms per group, then the other two of $R^1$, $R^2$, and $R^3$ cannot both be alkyl groups having from 1 to 5 carbon atoms per group. It should also be clear that the present invention includes a method for stabilizing a thermoplastic resin, said method comprising: admixing an amine oxide with the thermoplastic resin and aromatic ketone compound, said amine oxide having the structural formula:

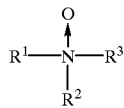

wherein $R^1$, $R^2$, and $R^3$ are independently selected from alkyl, aryl, aralkyl, alkaryl, cycloalkyl, alkcycloalkyl and cycloalkalkyl and each have from 1 to 36 carbon atoms per group, provided that if one of $R^1$, $R^2$, and $R^3$ is an alkyl group having from 6 to 36 carbon atoms per group, then the other two of $R^1$, $R^2$, and $R^3$ cannot both be alkyl groups having from 1 to 5 carbon atoms per group.

When the present compositions contain a stabilizing amount of a 3-arylbenzofuranone, the 3-arylbenzofuranone is of the formula

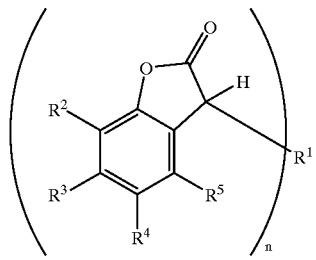

wherein, when n is 1, $R^1$ is an unsubstituted or substituted carbocyclic or heterocyclic aromatic ring system, wherein, when n is 2, $R^1$ is unsubstituted or $C_1$–$C_4$alkyl- or hydroxy-substituted phenylene or naphthylene; or is -$R^6$-X-$R^7$-, and wherein $R^2$, $R^3$, $R^4$ and $R^5$ are each independently of one another hydrogen, chloro, hydroxy, $C_1$–$C_{25}$alkyl, $C_7$–$C_9$-phenylalkyl, unsubstituted or $C_1$–$C_4$alkyl-substituted phenyl, unsubstituted or $C_1$–$C_4$alkyl-substituted $C_5$–$C_8$cycloalkyl; $C1$–$C_{18}$alkoxy, $C_1$–$C_{18}$alkylthio, $C_1$–$C_4$alkylamino, di-($C_1$–$C_4$alkyl)amino, $C1$-$C_{25}$alkanoyloxy, $C_1$–$C_{25}$alkanoylamino, $C_3$–$C_{25}$alkenoyloxy, $C_3$–$C_{25}$alkanoyloxy which is interrupted by oxygen, sulfur or >N-$R^8$; $C_6$–$C_9$cycloalkylcarbonyloxy, benzoyloxy or $C_1$–$C_{12}$alkyl-substituted benzoyloxy; or each pair of substituents $R^2$ and $R^3$ or $R^3$ and $R^4$ or R4 and $R^5$, together with the linking carbon atoms, forms a benzene ring; $R^4$ is additionally —$(CH_2)_p$—$COR^9$ or —$(CH_2)_q$OH, or, if $R^3$ and $R^5$ are hydrogen, $R^4$ is additionally a radical of formula

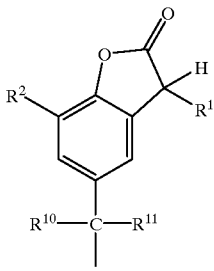

wherein $R^1$ is as defined above when n=1, $R^6$ and $R^7$ are each independently of the other unsubstituted or $C_1$–$C_4$alkyl-substituted phenylene or naphthylene, $R^8$ is hydrogen or $C_1$–$C_8$alkyl, $R^9$ is hydroxy, (—O$^-$1/r M$^{r+}$); $C_1$–$C_{18}$ alkoxy or

$R^{10}$ and $R^{11}$ are each independently of the other hydrogen, $CF_3$, $C_1$–$C_{12}$alkyl or phenyl, or $R^{10}$ and $R^{11}$, together with the linking carbon atom, form a $C_5$–$C_8$cycloalkylidene ring which is unsubstituted or substituted by 1 to 3 $C_1$–$C_4$alkyl groups, $R^{14}$ is hydrogen or $C_1$–$C_{18}$alkyl, M is a metal cation of valency
r, X is a direct bond, oxygen, sulfur or $NR^{14}$,
n is 1 or 2,
p is 0, 1 or 2,
q is 1,2,3,4,5 or 6, and
r is 1, 2 or 3, which process comprises reacting a compound of formula

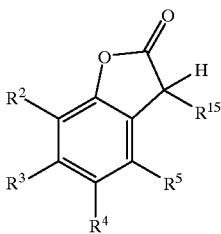

wherein $R^{15}$ is halogen or —$OR'^{15}$, $R'^{15}$ is hydrogen, $C_1$–$C_2$alkanoyl, $C_3$–$C_{25}$alkenoyl, $C_3$–$C_{25}$alkanoyl which is interrupted by oxygen, sulfur or

$C_6$–$C_9$cycloalkylcarbonyl, thenoyl, furoyl, benzoyl or $C_1$–$C_{12}$alkyl-substituted benzoyl; naphthoyl or $C_1$–$C_{12}$alkyl-substituted naphthoyl; $C_1$–$C_{25}$alkanesulfonyl, fluoro-substituted $C_1$–$C_{25}$alkanesulfonyl; phenylsulfonyl or $C_1$–$C_{12}$alkyl-substituted phenylsulfonyl;

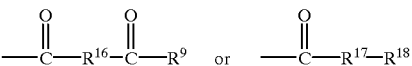

$R^{16}$ is a direct bond, $C_1$–$C_{18}$alkylene, $C_2$–$C_{18}$alkylene which is interrupted by oxygen, sulfur or

$C_2$–$C_{18}$alkemylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenyleney,

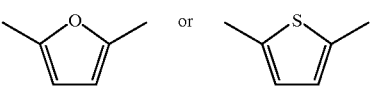

$R^{17}$ is oxygen, —NH— or

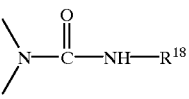

and
$R^{18}$ is $C_1$–$C_{18}$alkyl or phenyl, with a compound of formula $[H]_n$-$R^1$.

Useful 3-arylbenzofuranones are known compounds and include those found in U.S. Pat. Nos. 4,325,863; 4,338,244, 5,175,312, and 5,607,624.

An especially preferred 3-arylbenzofuranone for use in the present invention is 5,7-di-tert-butyl-3-(3,4-dimethylphenyl)-3H-benzofuran-2-one.

When the instant compositions contain an organic phosphorus compound, such compounds may be, for example, triphenyl phosphite, diphenylalkyl phosphites, phenyldialkyl phosphites, tri-(nonylphenyl) phosphite, trilauryl phosphite, trioctadecyl phosphite, di(isodecyloxy)-2,4,8,10-tetraoxa-3,9-diphospha-[5.5]-undecane, and tri-(4-hydroxy-3,5-di-tert.butylphenyl) phosphite, and/or similar phosphonites.

The organic phosphorus compounds of particular interest include those selected from the group consisting of tris(24-di-tert-butylphenyl) phosphite, 3,9-di(2,4-di-tert-butylphenoxy)-2,4,8,10-tetraoxa-3,9-diphosphaspiro[5.5]undecane, 3,9-di(2,4-dicumylphenoxy)-2,4,8,10-tetraoxa-3,9-diphosphaspiro[5.5]undecane, tris(p-nonylphenyl) phosphite, 2,2',2"-nitrilo[triethyl-tris[3,3',5,5'-tetra-tertbutyl-1,1'-biphenyl-2'-diyl]phosphite], 3,9-distearyloxy-2,4,8,10-tetraoxa-3,9-diphosphaspiro[5.5]undecane, dilauryl phosphite, 3,9-di[2,6-di-tert-butyl-4-methyl-phenoxy]-2,4,8,10-tetraoxa-3,9-diphosphaspiro[5.5]undecane and tetrakis(2,4-di-tert-butylphenyl) 4,4'-bis(diphenylene) phosphonite, distearyl pentaerythritol diphosphite, diisodecyl pentaerythritol diphosphite, 2,4,6-tri-tert-butylphenyl-2- butyl-2-ethyl-1,3-propanediol phosphite, tristearyl sorbitol triphosphite, tetrakis(2,4-di-tert-butylphenyl)4,4'-biphenylene diphosphonite, (2,4,6-tri-tert-butylphenyl)-2-butyl-2-ethyl-1,3-propanediolphosphite, tri-isodecylphosphite, and mixtures of phosphites containing at least one of the foregoing. Tris(2,4-di-tert-butylphenyl) phosphite, 2,4,6-tri-tert-butylphenyl-2-butyl-2-ethyl-1,3-propanediol phosphite, bis(2,4di-tert-butylphenyl) pentaerythritol diphosphite are especially preferred, as well as mixtures of phosphites containing at least one of the foregoing phosphites.

When the instant compositions contain a thiosynergist, such thiosynergists may be for example dilauryl thiodipropionate, distearyl thiodipropionate or neopentane-tetrayl tetrakis(3-dodecylthiopropionate). Distearyl thio-dipropionate or dilauryl thiodipropionate is particularly preferred.

When the instant compositions contain a hydrotalcite and/or an alkaline metal salt of a fatty acid, such salts are the alkali metal, alkaline earth metal, zinc, cadmium or aluminum salts of the higher fatty acids, for example, calcium stearate, zinc stearate, magnesium behenate, sodium ricinoleate, or potassium palmitate. Hydrotalcites included are magnesium-aluminum-hydroxycarbonates and zinc-aluminum hydroxycarbonates. Calcium stearate and hydrotalcites are particularly preferred.

When the instant compositions contain a hindered amine stabilizer, such hindered amines may for example be 4-benzoyl-2,2,6,6-tetramethylpiperidine, 4-stearyloxy-2,2-6,6-tetramethylpiperidine, bis-(2,2,6,6-tetramethylpiperidyl)sebacate, or 3-n-octyl-7,7,9,9-tetramethyl-1,3,-8-triaza-spiro[4.5]decane-2,4-dione. Amine oxides of hindered amine stabilizers are also included in the present invention.

The hindered amine stabilizers of particular interest are selected from the group consisting of bis(2,2,-6,6-tetramethylpiperidin4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)-butylmalonate, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2]heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6-6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N'',N'''-tetrakis[(4,6-bis(butyl-(2,2,6,6-tetramethylpiperidin-4-yl)-amino-s-triazin-2-yl]-1,10-diamino-4,7diazadecane, octamethylene bis(2,2,6,6-tetramethylpiperidin-4-carboxylate), and 4,4'-ethylenebis-(2,2,6,6-tetramethylpiperazin-3-one).

A most preferred embodiment has as the hindered amine stabilizer bis(2,2,6,6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylarnino-s-triazine and 4,4'-hexamethylenebis(amino-2,2-6,6-tetramethylpiperidine), or N,N',N'',N'''-tetrakis[(4,6-bis(butyl-(2,2,6,6-tetramethyl-piperidin-4-yl)amino)-s-triazine-2-yl]-1,10-diamino-4,7-diazadecane, as well as mixtures of amine stabilizers containing at least one of the foregoing.

When the instant compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-alpha-methylbenzyl -5'-methyl, 3'- alpha-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2,4-bis-(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxybenzoyl)-benzene.

Esters of optionally substituted benzoic acids, e.g., phenylsalicylate octylphenylsalicylate, dibenzoylresorcin, bis-(4-tert.-butylbenzoyl)-resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester.

Acrylates, e.g., alpha -cyano- beta, beta -diphenylacrylic acid-ethyl ester or isooctyl ester, alpha -carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline.

Oxalic acid diamides, e.g., 4,4'-di-octyloxy-oxanilide, 2,2'-di-octyloxy-5,5'-di-tert.-butyl-oxanilide, 2,2'-di-dodecyloxy-5,5-di-tert.-butyl-oxanilide, 2-ethoxy-2'-ethyl-oxanilide, N,N'-bis-(3-dimethyl-aminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of orlho- and para-methoxy- as well as of o- and p-ethoxy-disubstituted oxanilides.

Preferably the ultraviolet light absorber used in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-ditert-butyloxanilide.

When the instant compositions contain a hydroxylamine, such hydroxylamines include, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-dibenzylhydroxylamine, N,N-didecylhydroxylamine, N,N-di(coco alkyl) hydroxylamine, N,N-di($C_{20}$–$C_{22}$ alkyl)hydroxylamine, and N,N-dialkylhydroxylamine derived from hydrogenated tallow amine (i.e., N,N-di(tallow alkyl)hydroxylamine), as well as mixtures containing any of the foregoing. Other useful hydroxylamines are known in the art such as these in U.S. Pat. Nos. 3,644,278; 3,778,464; and 4,590,231.

The additives and stabilizers described herein are preferably present in an amount effective to improve the melt stability and/or the yellowness index of a thermoplastic composition. When one of the aforementioned additives and stabilizers is utilized, the amount is generally less than about 5 weight percent based on the weight of the thermoplastic resin and is preferably at least about 50 ppm based on the weight of the thermoplastic resin.

The stabilizer combinations of this invention stabilize polymeric resins especially during high temperature processing with relatively little change in melt index and/or color, even though the polymer may undergo a number of extrusions.

The instant stabilizers may readily be incorporated into the polymeric resins by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized compositions of the invention may optionally also contain from about 0.001 to about 5%, preferably from about 0.0025 to about 2%, and especially from about 0.005% to about 1%, by weight of various conventional additives, such as the following, or mixtures thereof.

The following may be mentioned as examples of further additives that can be used in the instant compositions.

Metal deactivators, e.g., oxanilide, isophthalic acid dihydrazide, sebacic acid-bis-phenylhydrazide, bis-benzylideneoxalic acid dihydrazide, N,N'-diacetal-adipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)-hydrazine, N-salicyloyl-N'-salicylalhydrazine, 3-salicyloyl-amino-1,2,4-triazole or N,N'-bis-salicyloyl-thiopropionic acid dihydrazide.

Nucleation agents, e.g., 4-tert.-butylhenzoic acid, adipic acid, diphenylacetic acid or substituted sorbitols such as 1,3; 2,4-dibenzylidenesorbitol.

Other additives that can be incorporated in the stabilized compositions are antiblocking agents, clarifiers, epoxydized soybean oil, antiozonants, lubricants such as stearyl alcohol, fillers, carbon black, asbestos, kaolin, talc, glass fibers, pigments, colorants or dyes, optical brighteners, flameproofing agents and antistatic agents.

The compositions of the present invention can be prepared by a variety of methods involving intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with a portion of the polymeric resin to make a stabilizer concentrate. Moreover, it is also sometimes advantageous to employ at least one vent port to allow venting (either atmospheric or vacuum) of the melt. Those of ordinary skill in the art will be able to adjust blending times and temperatures, as well as component addition location and sequence, without undue additional experimentation.

While the stabilizers of this invention may be conveniently incorporated by conventional techniques into polymeric resins before the fabrication thereof into shaped articles, it is also possible to apply the instant stabilizers by a topical application to the finished articles. This is particularly useful with fiber applications where the instant stabilizers are applied topically to the fibers, for example, by way of a spin finish during the melt spinning process.

All patents and references cited herein are incorporated by reference herein.

The following examples are presented for the purpose of illustration only and are not to be construed to limit the nature of scope of the instant invention in any manner whatsoever.

EXAMPLES

In a typical process for the practice of the present invention, the test stabilizer was blended/mixed with the resin using Turbula Blender for 30 minutes. The test stabilizer, if liquid, was preblended with a portion of a resin which was then subsequently blended with the resin and mixed well using Turbula Blender. The stabilized resin formulation was extruded at 100 rpm from a 1 inch (2.54 cm) diameter extruder at 500° F. (260° C.) (Killion extruder). The rpm and temperatures may be adjusted according to the resin utilized.

After each of the first, third and fifth extrusions, the melt flow rate (in grams/10 minutes) was measured (ASTM-D-1238) on the pellets. The closer the melt flow rate after the fifth extrusion is to the melt flow rate after the first extrusion indicates the superior process stabilization of the resin.

To illustrate some of the embodiments of the present invention, the following components were utilized.

| | |
|---|---|
| anthrone | 300 ppm |
| anthralin | 300 ppm |
| deriv-1 | methyl-9,10-dihydro-9-hydroxy-9,10-ethanoanthracene-11-carboxylate, 300 ppm |
| deriv-2 | 9,10-dihydroanthracene, 300 ppm |
| deriv-3 | anthrone oxime, 300 ppm |
| deriv-4 | 1,4-naphthaquinone, 300 ppm |
| TTBPP | tris(2,4-di-tert-butylphenyl)phosphite, 300 ppm |
| phenol-1 | tetrakis(methylene 3-(3,5-di-tert-butyl-4-hydroxyphenyl)proprionate) methane, a commercially available hindered phenol, available from Ciba-Geigy under the tradename IRGANOX as grade 1010 |

Each of the examples in Table 1 utilized a commercially available polypropylene resin obtained from Himont as grade Profax R 6301 to which 500 ppm of calcium stearate was added. The compositions of Table 1 demonstrate the broad utility and advantageous properties that may be obtained for compositions that do contain an aromatic ketone compound.

TABLE 1

| Sample | 1 | 2 | 3 | 4 | 5 | 6 | 7 | 8 |
|---|---|---|---|---|---|---|---|---|
| TTBPP | 0 | 300 | 0 | 0 | 0 | 0 | 0 | 0 |
| anthrone | 0 | 0 | 300 | 0 | 0 | 0 | 0 | 0 |
| anthralin | 0 | 0 | 0 | 300 | 0 | 0 | 0 | 0 |
| deriv-1 | 0 | 0 | 0 | 0 | 300 | 0 | 0 | 0 |
| deriv-2 | 0 | 0 | 0 | 0 | 0 | 300 | 0 | 0 |
| deriv-3 | 0 | 0 | 0 | 0 | 0 | 0 | 300 | 0 |
| deriv-4 | 0 | 0 | 0 | 0 | 0 | 0 | 0 | 300 |
| MFR | | | | | | | | |
| compounded | 19.6 | 17.5 | 12.4 | 11.9 | 13.3 | 15.35 | | 13.75 |
| 1-pass | >50 | 27.6 | 14.3 | 12.6 | 14.6 | 15.13 | | 15.13 |
| 3-pass | | >50 | 18.5 | 14.6 | 17.8 | 23.8 | | 17.3 |
| 5-pass | | | 19.7 | 16 | 21.5 | 32.5 | | 19.7 |

The compositions in Table 1 illustrate the tremendous improvements in properties that are obtained with the aromatic ketone compounds of the present invention. As seen by the above data, sample 1, a control containing only calcium stearate, exhibits very poor melt stability as indicated by the very high melt index after only the first additional pass through a compounding extruder. Sample 2 containing a known phosphite stabilizer is much improved over the control yet illustrates the need for improvements in stabilization. Samples 3 through 8, each containing an aromatic ketone compound of the present invention unexpectedly show remarkable enhancement in the melt stability of the resin. For example, sample 3 containing anthrone has a melt flow rate after five multiple passes through a compounding extruder that approximates the same value as the control after only a single pass. Sample 4, containing anthralin illustrates an even more unexpected result in having markedly superior melt index stability even after five additional passes through a compounding extruder even to sample 2 containing a known stabilizer.

The further illustrate embodiments of the present invention, compositions were prepared containing combinations of stabilizers with the aromatic ketone compounds. Each of the examples in Table 1 utilized a commercially available polypropylene resin obtained from Himont as grade Profax R 6501, a lower melt index resin that Profax 6301, to which 500 ppm of calcium stearate was added with multiple extrusion passes at 270° C.

TABLE 2

| Sample | 1 | 2 | 3 |
|---|---|---|---|
| phenol-1 | 500 | 500 | 425 |
| TTBPP | 0 | 500 | 425 |
| anthrone | 0 | 0 | 125 |
| MFR | | | |
| compounded | 5.95 | 4.52 | 3.93 |
| 1-pass | 14.5 | 8.47 | 6.8 |
| 3-pass | 29.9 | 14.8 | 10.5 |
| 5-pass | 41.4 | 22.1 | 14.8 |

Sample containing only a hindered phenol is a control that illustrates the poor stability of the resin under these conditions. Sample 2, containing both a hinered phenol and a commercially available phosphite, is markedly better that sample 1 in multiple extrusion passes. Sample 3, containing an aromatic ketone compound of the present invention, used in combination with a hindered phenol and a commercially available phosphite was dramatically improved even over sample 2. It is noted that samples 2 and 3 each contain an overall stabilizer level of 1000 ppm. The synergistic improvement in stability for a combination of at least one stabilizer with an aromatic ketone compound was unexpected.

What is claimed :

1. A stabilized resin composition comprising:
   (a) a thermoplastic resin or mixture thereof, and
   (b) a stabilizing amount of a compound selected from the group consisting of an aromatic ketone compound having the formula:

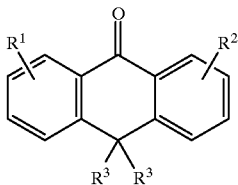

wherein
$R^1$ and $R^2$ are each independently a hydrogen, hydroxyl, thio, thio-ether, alkoxy, aryloxy, or alkyl moiety, and each $R^3$ is independently a hydrogen, alkyl, aryl, or substituted alkyl moiety containing at least one —O—, —S—, —SO—, —CO$_2$—, —CO—, or —CON— moiety, and wherein there may be multiple $R^1$ and $R^2$ groups; an aromatic ketone compound having the formula:

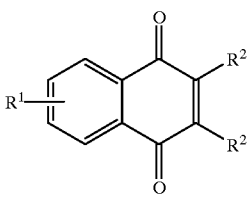

wherein
$R_1$ and each $R^2$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent $R^1$ groups; an aromatic ketone compound having the formula:

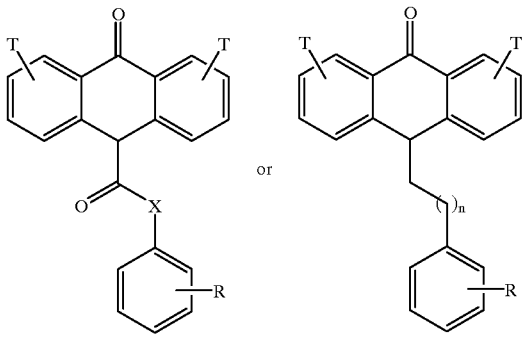

wherein
each T can independently be hydrogen, hydroxyl, thio, thio-ether, alkoxy, aryloxy, or alkyl moiety, and R can be hydrogen, alkyl, hydroxy, aryloxy, arylmethoxy, halo, mercapto, amino, substituted mercapto, or substituted amino, and wherein there may be multiple independent R and T groups present, and wherein X is selected from alkylidene and substituted alylkidene, and wherein n ranges from 0 to about 6;

a derivative of an aromatic ketone compound having the formula:

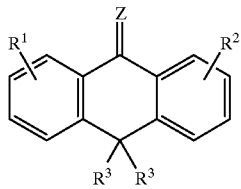

wherein

R$^1$ and R$^2$ are independently a hydrogen, hydroxyl, thio, thio-ether, alkoxy, aryloxy, or alkyl moiety, and each R$^3$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent R$^1$ and R$^2$ groups, and wherein Z is selected from the group consisting of NR$^4$, N(OH), NNHR$^4$, and NOR$^4$ wherein R$^4$ is alkyl, aryl or an substituted alkyl or substituted aryl moiety, optionally containing at least one —O—, —S—, —SO—, —CO$_2$—, —CO—, or —CON— moiety;

and an adduct of an aromatic ketone compound having the formula:

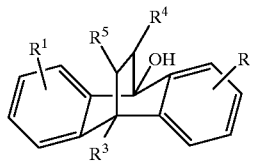

wherein

R$^1$ and R$^2$ are independently a hydrogen, hydroxyl, thio, thio-ether, alkoxy, aryloxy, or alkyl moiety, and wherein there may be multiple R$^1$ and R$^2$ groups, and R$^3$ is a hydrogen, alkyl, aryl, or substituted alkyl or substituted aryl moiety containing at least one —O—, —S—, —SO—, —CO$_2$—, —CO—, or —CON— moiety and wherein R$^4$ and R$^5$ are independently hydrogen, alkyl, aryl, alkaryl, ester, acid, ether, amide, thioester, amine, or interconnected to form a ring, such as an imide or anhydride, and wherein each of R$^4$ and R$^5$ may independently contain additional species of the group consisting of hydrogen, alkyl, aryl, alkaryl, acid, ester, hydoxyl, imide, amide, anhydride, thioester, ether, thioether, phosphate, oxazoline, epoxy, amino, and orthoester.

2. The composition of claim 1 wherein the aromatic ketone compound is represented by the general formula:

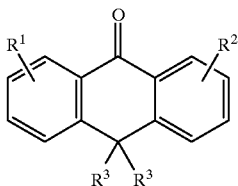

wherein

R$^1$ and R$^2$ are each independently a hydrogen, hydroxyl, thio, thio-ether, alkoxy, aryloxy, or alkyl moiety, and each R$^3$ is independently a hydrogen, alkyl, aryl, or substituted alkyl moiety containing at least one —O—, —S—, —SO—, —CO$_2$—, —CO—, or —CON— moiety, and wherein there may be multiple R$^1$ and R$^2$ groups.

3. The composition of claim 1 wherein the aromatic ketone compound is selected from the group consisting of:

(i) anthrone and derivatives of anthrone, (ii) anthralin and derivatives of anthralin, (iii) an adduct of anthrone and derivatives of anthrone, (iv) an adduct of anthralin and derivatives of anthralin, and (v) mixtures containing any of the foregoing.

4. The composition of claim 1 wherein the aromatic ketone compound comprises at least one of anthrone, a derivative of anthrone, or an adduct of anthrone.

5. The composition of claim 1 wherein the aromatic ketone compound comprises at least one of anthralin, a derivative of anthralin, or an adduct of anthralin.

6. The composition of claim 1 wherein the adduct of an aromatic ketone compound comprises a Diels-Alder adduct of anthrone, anthalin, or a derivative of anthrone or anthralin and a dienophile.

7. The composition of claim 1 wherein component (b) is represented by the general formula:

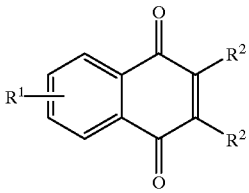

wherein

R$^1$ and each R$^2$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent R$^1$ groups.

8. The composition of claim 1 wherein component (b) is represented by the general formulas:

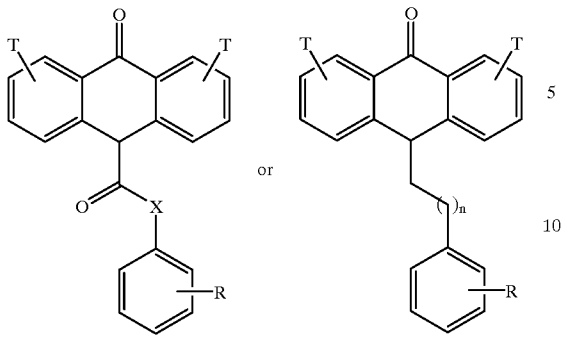

wherein
each T can independently be hydrogen, hydroxyl, thio, thio-ether, alkoxy, aryloxy, or alkyl moiety, and R can be hydrogen, alkyl, hydroxy, aryloxy, arylmethoxy, halo, mercapto, amino, substituted mercapto, or substituted amino, and wherein there may be multiple independent R and T groups present, and wherein X is selected from alkylidene and substituted alylkidene, and wherein n ranges from 0 to about 6.

9. The composition of claim 1 wherein component (b) is represented by the general formula:

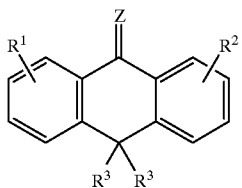

wherein
$R^1$ and $R^2$ are independently a hydrogen, hydroxyl, thio, thioether, alkoxy, aryloxy, or alkyl moiety, and each $R^3$ is independently a hydrogen, alkyl, aryl, or substituted alkyl or substituted aryl moiety containing at least one —O—, —S—, —SO—, —CO$_2$—, —CO—, or —CON— moiety, and wherein there may be multiple independent $R^1$ and $R^2$ groups, and wherein Z is selected from the group consisting of, NR$^4$N(OH), NNHR$^4$, and NOR$^4$ wherein $R^4$ is alkyl, aryl or an substituted alkyl or substituted aryl moiety, optionally containing at least one —O—, —S—, —SO—, —CO$_2$—, —CO—, or —CON— moiety.

10. The composition of claim 1 wherein the adduct of the aromatic ketone compound is represented by the general formula:

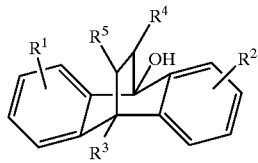

wherein
$R^1$ and $R^2$ are independently a hydrogen, hydroxyl, thio, thioether, alkoxy, aryloxy, or alkyl moiety, and wherein there may be multiple $R^1$ and $R^2$ groups, and $R^3$ is a hydrogen, alkyl, aryl, or substituted alkyl or substituted aryl moiety containing at least one —O—, —S—, —S—, —CO$_2$—, —CO—, or —CON— moiety and wherein $R^4$ and $R^5$ are independently hydrogen, alkyl, aryl, alkaryl, ester, acid, ether, amide, thioester, amine, or interconnected to form a ring, such as an imide or anhydride, and wherein each of $R^4$ and $R^5$ may independently contain additional species of the group consisting of hydrogen, alkyl, aryl, alkaryl, acid, ester, hydoxyl, imide, amide, anhydride, thioester, ether, thioether, phosphate, oxazoline, epoxy, amino, and orthoester.

11. The composition of claim 1 further comprising a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydrotalcites, the epoxydized soybean oils, the hydroxylamines, the tertiary amine oxides, thermal reaction products of a tertiary amine oxides, and the thiosynergists.

12. The composition of claim 6 wherein the dienophile is a compound comprising both (i) a carbon-carbon double bond or a carbon-carbon triple bond and (ii) at least one species of the group consisting of hydrogen, alkyl, aryl, alkaryl, acid, ester, hydoxyl, imide, amide, anhydride, thioester, phosphate, ether, thioether, oxazoline, epoxy, amino, and orthoester.

13. The composition of claim 6 wherein the dienophile is selected from the group consisting of maleic anhydride, maleic acid, maleimides, acrylic acids, and acrylic esters.

14. The composition of claim 6 further comprising a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydroxylamines, the tertiary amine oxides, thermal reaction products of a tertiary amine oxides, and the thiosynergists.

15. The composition of claim 1 wherein the thermoplastic resin comprises at least one resin of the group consisting of polyesters, polyurethanes, polyalkylene terephthalates, polyketones, polysulfones, polyimides, polyphenylene ethers, styrenic polymers, polycarbonates, acrylic polymers, polyamides, polyacetals, halide containing polymers and polyolefin homopolymers and copolymers.

16. The composition of claim 1 wherein the thermoplastic resin comprises a polyolefin resin.

17. The composition of claim 1 wherein thermoplastic resin is selected from the group consisting of polypropylene, low density polyethylene, medium density polyethylene, high density polyethylene, linear low density polyethylene, poly(butene-1), ethylene/vinyl acetate copolymer, ethylene/propylene copolymer, and copolymers of ethylene or of propylene with other alpha-olefins.

18. The composition of claim 1 wherein the composition further comprises an additional stabilizer or mixture of stabilizers.

19. The composition of claim 1 wherein the composition further comprises a phenolic antioxidant or mixture thereof.

20. The composition of claim 1 wherein the composition further comprises at least one phenolic antioxidant is selected from the group consisting of neopentanetetrayl tetrakis(3,5-di-tert-butyl4-hydroxyhydrocinnamate), n-octadecyl 3,5-di-tert-butyl4-hydroxyhydrocinnamate, 1,3,5-trimethyl-2,4,6-tris(3,5-di-tert-butyl4-hydroxybenzyl) benzene, 1,3,5-tris-(3,5-di-tert-butyl4-hydroxybenzyl) isocyanurate, 2,6-di-tert-butyl-p-cresol and 2,2'-ethylidene-bis(4,6-di-tert-butylphenol).

21. The composition of claim 1 wherein the composition further comprises a stabilizing amount of at least one phenolic antioxidant selected from the group consisting of n-octadecyl 3,5-di-tert-butyl4-hydroxyhydrocinnamate, neopentanetetrayl tetrakis(3,5-di-tert-butyl4-hydroxyhydrocinnamate), di-n-octadecyl 3,5-di-tert-butyl4-hydroxybenzylphosphonate, 1,3,5-tris(3,5 -di-tert-butyl4-hydroxybenzyl)isocyanurate, thiodiethylene bis(3,5-di-tert-butyl4-hydroxyhydrocinnamate), 1,3,5-trimethyy-2,4-6-tris (3,5-di-tert-butyl4-hydroxybenzyl)benzene, 3,6-di-oxaoctamethylene bis(3-methyl-5-tert-butyl4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris (2-methyl4-hydroxy-5-tert-butylphenyl)butane, 1,3,5-tris[2-(3,5-di-tert-butyl4-hydroxyhydrocinnamoyloxy)-ethyl]-isocyanurate, 3,5-di-(3,5-di-tert-butyl4-hydroxybenzyl)-mesitol, hexamethylene bis(3,5-di-tert-butyl4-hydroxyhydrocinnamate), 1-(3,5-di-tert-butyl4-hydroxyanilion)-3,-5-di(octylthio)-s-triaxine, N,N'-hexamethylene-bis(3,5-di-tert-buty4-hydroxyhydrocinnamamide), calcium bis(ethyl 3,5-di-tert-butyl-4-hydroxybenzylphosphonate), ethylene bis[3,3-di(3-tert-butyl4-hydroxyphenyl)butyrate], octyl 3,5-di-tert-butyl4-hydroxybenzylmercaptoacetate, bis(3,5-di-tert-butyl4 hydroxyhydrocinnamoyl)hydrazide, vitamin E and derivatives of vitamin E, and N,N'-bis[2-(3,5-tert-butyl4-hydroxyhydroxocinnamoyloxy)ethyl]oxamide.

22. The composition of claim 1 wherein the composition further comprises a hindered amine stabilizer or mixture thereof.

23. The composition of claim 1 wherein the composition further comprises a stabilizing amount of at least one hindered amine stabilizer is selected from the group consisting of bis(2,2,6,6-tetramethylpiperidin-4-yl) sebacate, bis(1,2,2,6,6-pentamethylpiperidin-4-yl) sebacate, di(1,2,2, 6,6-pentamethylpiperidin-4-yl) (3,5-di-tert-butyl-4-hydroxybenzyl)-butylmalonate, tris-(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro- [5.1.11.2]-heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylene-bis(amino-2,2,-6,6-tetramethylpiperidine) and 1,2-dibromoethane, polycondensation product of 2,4-dichloro-6-moropholino-s-triazine and 4,4'-hexamethylenebis(amino-2,2,6,6-tetramethylpiperidine) N,N',N'',N'''-tetrakis[(4,6-bis(butyl-(2,2,6,6-tetramethylpiperidin-4-yl)amino)-s-triaxine-2-yl]-1,10-diamino-4,7-diazadecane, octamethylene bis(2,2,6,6-tetramethylpiperidin-4-carbosylate), 4,4'-ethylenebis(2,2,6,-6-tetramethylpiperazine-3-one), and mixtures thereof.

24. The composition of claim 1 wherein the composition further comprises at least one organic phosphorus compound.

25. The composition of claim 1 wherein the composition further comprises a stabilizing amount of at least one organic phosphorus compound selected from the group consisting of tris(2,4-di-tert-butylphenyl) phosphite, 3,9-di(2,4-di-tert-butylphenoxy)-2,4,8,10-tetraoxa-3,9-diphosphaspiro[5.5] undecane, 3,9-di(2,4-dicumylphenoxy)-2,4,8,10-tetraoxa-3, 9-diphosphaspiro[5.5]undecane, tris(p-nonylphenyl) phosphite, 2,2',2''-nitrilo[triethyl-tris[3,3',5,5'-tetra-tertbutyl-1,1'-biphenyl-2'-diyl]phosphite], 3,9-distearyloxy-2,4,8,10-tetraoxa-3,9-diphosphaspiro[5.5]undecane, dilauryl phosphite, 3,9-di[2,6-di-tert-butyl-4-methyl-phenoxy]-2, 4,8,10-tetraoxa-3,9-diphosphaspiro[5.5]undecane and tetrakis(2,-4-di-tert-butylphenyl) 4,4'-bis(diphenylene) phosphonite, distearyl pentaerythritol diphosphite, diisodecyl pentaerythritol diphosphite, 2,4,6-tri-tert-butylphenyl-2-butyl-2-ethyl-1,3-propanediol phosphite, tristearyl sorbitol triphosphite, tetrakis(2,4di-tert-butylphenyl)4,4'-biphenylene diphosphonite, (2,4,6-tri-tert-butylphenyl)-2-butyl-2-ethyl-1,3-propanediolphosphite, tri-isodecylphosphite, and mixtures of phosphites containing at least one of the foregoing.

26. The composition of claim 1 wherein the composition further comprises at least one hydroxylamine.

27. The composition of claim 1 wherein the composition further comprises a stabilizing amount of at least one hydroxylamine selected from the group consisting of N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-dibenzylhydroxylamine, N,N-didecylhydroxylamine, N,N-di(coco alkyl) hydroxylamine, N,N-di(tallow alkyl)hydroxylamine, N,N-di($C_{20}$–$C_{22}$ alkyl)hydroxylamine, N,N-di($C_{14}$–$C_{22}$alkyl) hydroxylamine, and mixtures containing any of the foregoing.

28. The composition of claim 1 wherein the composition further comprises at least one thiosynergist.

29. The composition of claim 1 wherein the composition further comprises a stabilizing amount of at least one thiosynergist selected from the group consisting of dilauryl thiodipropionate, distearyl thiodiproprionate and neopentanetetrayl tetrakis(3-dodecylthiopropionate).

30. The composition of claim 1 wherein the composition further comprises an alkaline metal salt of a fatty acid, a hydrotalcite, an epoxydized soybean oil, or mixtures thereof.

31. The composition of claim 1 wherein the composition further comprises a stabilizing amount of at least one 3-arylbenzofuranone.

32. The composition of claim 1 wherein the composition further comprises at least one tertiary amine oxide.

33. The composition of claim 1 wherein the composition further comprises a stabilizing amount of at least one tertiary amine oxide represented by the general formula:

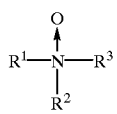

wherein $R^1$ and $R^2$ are independently each a $C_6$ to $C_{36}$ residue that may optionally contain at least one —O—, —S—, —SO—, —CO$_2$—, —CO—, or —CON— moiety; and wherein $R^3$ is a $C_1$ to $C_{36}$ residue that may optionally contain at least one —O—, —S—, —SO—, —CO$_2$—, —CO—, or —CON— moiety.

34. The composition of claim 1 wherein the composition further comprises at least one tertiary amine oxide selected from the group consisting of dioctyl methyl amine oxide, trioctyl amine oxide, didecyl methyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$–$C_{22}$) amine oxide, di($C_{20}$–$C_{22}$ alkyl) methyl amine oxide, di($C_{14}$–$C_{22}$ alkyl) methyl amine oxide, and mixtures containing any of the foregoing.

35. The composition of claim 1 wherein the composition further comprises at least one thermal reaction product of a tertiary amine oxide.

36. The composition of claim 1 wherein the composition further comprises a stabilizing amount of a phenolic antioxidant or mixture thereof in combination with a stabilizing amount of:
   a) an organic phosphorus compound or mixture thereof; or
   b) a hindered amine stabilizer or mixture thereof; or
   c) a thiosynergist or mixture thereof; or
   d) an ultraviolet light absorber or mixture thereof; or
   e) a hindered amine stabilizer and an organic phosphorus compound or mixtures thereof; or
   f) a hindered amine stabilizer, a thiosynergist and an organic phosphorus compound or mixtures thereof; or
   g) an ultraviolet light absorber and a hindered amine stabilizer or mixtures thereof; or
   h) an ultraviolet light absorber and an organic phosphorus compound or mixtures thereof; or
   i) an alkaline metal salt of a fatty acid or mixture thereof;
   j) a hydrotalcite or mixture thereof, or
   k) an epoxydized soybean oil or mixture thereof, or
   l) a tertiary amine oxide or mixture thereof,
   m) a thermal reaction product of a tertiary amine oxide, or
   n) a hydroxyl amine or mixture thereof.

37. The composition of claim 1 wherein the composition further comprises a stabilizing amount of an organic phosphorus compound or mixture thereof in combination with a stabilizing amount of:
   a) a phenolic antioxidant or mixture thereof; or
   b) a hindered amine stabilizer or mixture thereof; or
   c) a thiosynergist or mixture thereof; or
   d) an ultraviolet light absorber or mixture thereof; or
   e) a hindered amine stabilizer and a phenolic antioxidant or mixtures thereof; or
   f) a hindered amine stabilizer, a thiosynergist and a phenolic antioxidant or mixtures thereof; or
   g) an ultraviolet light absorber and a hindered amine stabilizer or mixtures thereof; or
   h) an ultraviolet light absorber and a phenolic antioxidant or mixtures thereof; or
   i) an alkaline metal salt of a fatty acid or mixture thereof;
   j) a hydrotalcite or mixture thereof, or
   k) an epoxydized soybean oil or mixture thereof, or
   l) a tertiary amine oxide or mixture thereof,
   m) a thermal reaction product of a tertiary amine oxide, or
   n) a hydroxyl amine or mixture thereof.

38. A stabilized resin composition consisting essentially of:
   (a) a thermoplastic resin or mixture thereof,
   (b) a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, hydrotalcites, the epoxydized soybean oils, the hydroxylamines, the tertiary amine oxides, thermal reaction products of a tertiary amine oxides, and the thiosynergists, and
   (c) a stabilizing amount of at least one aromatic ketone compound, derivative of an aromatic ketone compound, or an adduct of an aromatic ketone compound.

39. A stabilized resin composition comprising:
   (a) a thermoplastic resin or mixture thereof,
   (b) a stabilizer or mixture of stabilizers selected from the group consisting of the phenolic antioxidants, the 3-arylbenzofuranones, the hindered amine stabilizers, the ultraviolet light absorbers, the organic phosphorus compounds, the alkaline metal salts of fatty acids, the hydrotalcites, the epoxydized soybean oils, the hydroxylamines, the tertiary amine oxides, thermal reaction products of tertiary amine oxides, and the thiosynergists, and
   (c) a stabilizing amount of at least one aromatic ketone compound, derivative of an aromatic ketone compound, or an adduct of an aromatic ketone compound.

* * * * *